(12) United States Patent
Park et al.

(10) Patent No.: US 11,794,515 B2
(45) Date of Patent: Oct. 24, 2023

(54) DEVICE FOR COUPLING RESONATOR TO VEHICLE WHEEL

(71) Applicants: Hyundai Motor Company, Seoul (KR); Kia Motors Corporation, Seoul (KR); SHINWOOSHIN CO., LTD., Gyeongsan-si (KR); HANDS CORPORATION Ltd., Incheon (KR); KWANG SUNG CORPORATION LTD, Dangjin-si (KR)

(72) Inventors: Doo Seek Park, Seoul (KR); Eun Sang Ryu, Daegu (KR); Hyeong Seop Kim, Gunpo-si (KR); Moon Seok Hwang, Incheon (KR); Gi Woo Lee, Daegu (KR); Hyung Ki Yoon, Incheon (KR); Kwang Hyun Cho, Incheon (KR); Jae Woo Sung, Siheung-si (KR); Soon Shik Kim, Gyeongsan-si (KR); Young Sik Kim, Incheon (KR)

(73) Assignees: Hyundai Motor Company, Seoul (KR); Kia Motors Corporation, Seoul (KR); SHINWOOSHIN CO., LTD., Gyeongsan-si (KR); HANDS CORPORATION Ltd., Incheon (KR); KWANG SUNG CORPORATION LTD, Dangjin-si (KR)

( * ) Notice: Subject to any disclaimer, the term of this patent is extended or adjusted under 35 U.S.C. 154(b) by 395 days.

(21) Appl. No.: 17/108,217

(22) Filed: Dec. 1, 2020

(65) Prior Publication Data
US 2021/0309048 A1 Oct. 7, 2021

(30) Foreign Application Priority Data

Apr. 3, 2020 (KR) .................. 10-2020-0040867

(51) Int. Cl.
B60B 21/12 (2006.01)
B60B 21/02 (2006.01)
B60C 19/00 (2006.01)

(52) U.S. Cl.
CPC ............ *B60B 21/12* (2013.01); *B60B 21/026* (2013.01); *B60C 19/002* (2013.01); *B60B 2900/133* (2013.01)

(58) Field of Classification Search
CPC . B60B 21/12; B60B 21/026; B60B 2900/133; B60C 19/002
See application file for complete search history.

(56) References Cited

U.S. PATENT DOCUMENTS 9,278,586 B2 * 3/2016 Kierzkowski ............ B60C 5/00
2020/0130410 A1 * 4/2020 Kamiyama ............ B60B 21/12

FOREIGN PATENT DOCUMENTS

KR 101893350 * 8/2018 ............ B60B 21/12
KR 10-2020-0109887 A 9/2020

* cited by examiner

Primary Examiner — Scott A Browne
(74) Attorney, Agent, or Firm — MORGAN, LEWIS & BOCKIUS LLP

(57) ABSTRACT

A device configured for coupling a resonator to a vehicle wheel, may include an annular first strap assembled with an external circumferential surface of the wheel rim and fixing positions of resonators disposed on the external circumferential surface of the wheel rim; and an annular second strap surrounding second flanges formed at second edge portions of the resonators based on an axial direction of the wheel rim and pressurizing the second flange toward the external circumferential surface of the wheel rim after first flanges, which are formed on second edge portions of the resonators based on an axial direction of the wheel rim, are inserted between the first strap and the external circumferential surface of the wheel rim.

11 Claims, 7 Drawing Sheets

DEVICE FOR COUPLING RESONATOR TO VEHICLE WHEEL

CROSS-REFERENCE TO RELATED APPLICATION

The present application claims priority to Korean Patent Application No. 10-2020-0040867 filed on Apr. 3, 2020, the entire contents of which is incorporated herein for all purposes by this reference.

BACKGROUND OF THE INVENTION

Field of the Invention

The present invention relates to a device for coupling a resonator to a vehicle wheel. More particularly, it relates to a device for coupling a resonator to a vehicle wheel, which robustly couples a resonator for improving a resonance sound to a vehicle wheel.

Description of Related Art

Recently, as a size of a wheel is enlarged with the advancement of a vehicle, it is required to solve a resonance sound which is an incidental side effect.

To solve the resonance sound, a resonator wheel having a resonator mounted on a vehicle wheel has been disclosed.

FIG. 7 is a diagram illustrating a conventional resonator wheel.

Referring to FIG. 7, in the conventional resonator wheel, an insertion groove 2 is formed in a wheel rim 1 to fix a resonator 3 to the wheel rim 1, and a fixing protrusion 4 is formed in the resonator 3 to correspond to the insertion groove 2.

However, in the conventional resonator wheel, when a strong impact is applied to the resonator 3 while driving, a breakage occurs in an insertion groove portion of the wheel rim 1.

For example, while the resonator wheel is driving on a road with a pothole at a high speed, a strong impact is applied to an internal side of the wheel rim 1 so that a breakage occurs in the insertion groove portion of the wheel rim 1.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a device configured for coupling a resonator to a vehicle wheel, which achieves robustness against an external force acting on a resonator while driving, and simultaneously, secure tire the ease of assembly.

Objectives of the present invention are not limited to the above-described objectives, and other objectives of the present invention, which are not mentioned, may be understood by the following description and also will be apparently understood through embodiments of the present invention. Furthermore, the objectives of the present invention may be implemented by means described in the appended claims and a combination thereof.

In various exemplary embodiments of the present invention, various aspects of the present invention provide a device configured for coupling a resonator to a vehicle wheel, which includes an annular first strap assembled with an external circumferential surface of the wheel rim and fixing positions of resonators disposed on the external circumferential surface of the wheel rim; and an annular second strap surrounding second flanges formed at first edge portions of the resonators and pressurizes the second flange toward the external circumferential surface of the wheel rim after first flanges, which are formed on second edge portions of the resonators based on an axial direction of the wheel rim, are inserted between the first strap and the external circumferential surface of the wheel rim.

The second strap may pressurize the second flange to a radially internal side of the wheel rim.

According to various exemplary embodiments of the present invention, the wheel rim may include a first annular wall configured to protrude from the external circumferential surface of the wheel rim to extend in a circumferential direction of the wheel rim; a second annular wall configured to protrude from the external circumferential surface of the wheel rim to extend in the circumferential direction of the wheel rim and disposed to be spaced from the first annular wall; and a resonator mounting portion which is formed between the first annular wall and the second annular wall and in which the resonators are disposed on an external surface of the resonator mounting portion in the circumferential direction thereof.

Furthermore, a plurality of beads may be formed in the first strap to be disposed to be spaced from each other in a circumferential direction of the first strap, and bead grooves in which the beads are insertable may be formed in the first flanges of the resonators.

Furthermore, the first strap may include a non-bead portion which is a section in which the beads are not formed, a first space may formed between the non-bead portion and the resonator mounting portion according to a size of the plurality of beads, and the first flange may be inserted into the first space. In the instant case, a size of the bead may be a size of the wheel rim in a radial direction thereof.

The first strap may be assembled with the resonator mounting portion prior to the resonators, and when the first strap is assembled with the resonator mounting portion, a bottom surface of the bead may be in contact with an external surface of the resonator mounting portion.

Meanwhile, a separation prevention protrusion may be formed at an edge portion of the second flange to protrude outward a radially external side of the wheel rim, and the separation prevention protrusion may prevent the second strap from being separated from the second flange in the axial direction of the wheel rim.

Furthermore, each of the resonators may include a resonator main body formed between the first flange and the second flange, and when the second strap is mounted on the second flange, the second strap may be located in a second space formed between the separation prevention protrusion and the resonator main body.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
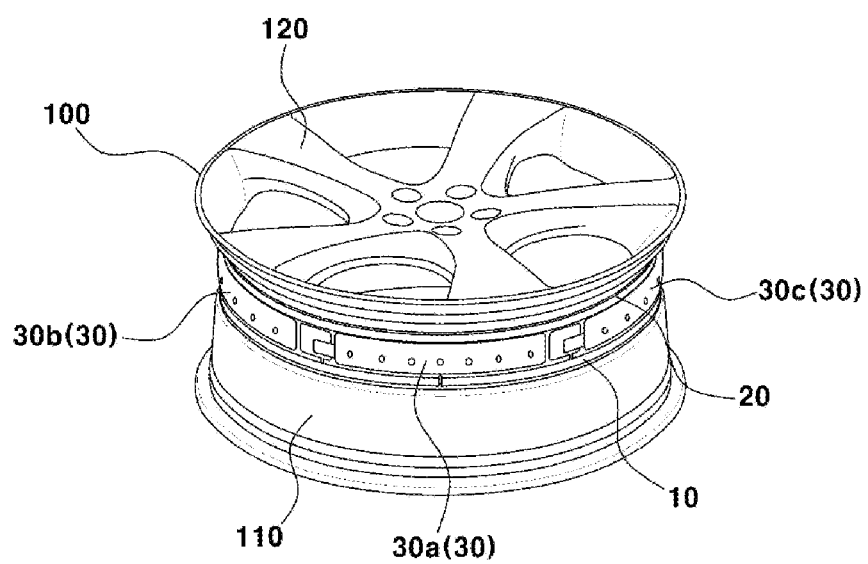
FIG. 1 is a perspective view exemplarily illustrating a resonator wheel according to various exemplary embodiments of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. Items shown in the drawings are schematically illustrated to easily describe the exemplary embodiments of the present invention, and thus the items may be different from those actually implemented.

Figure 2A:
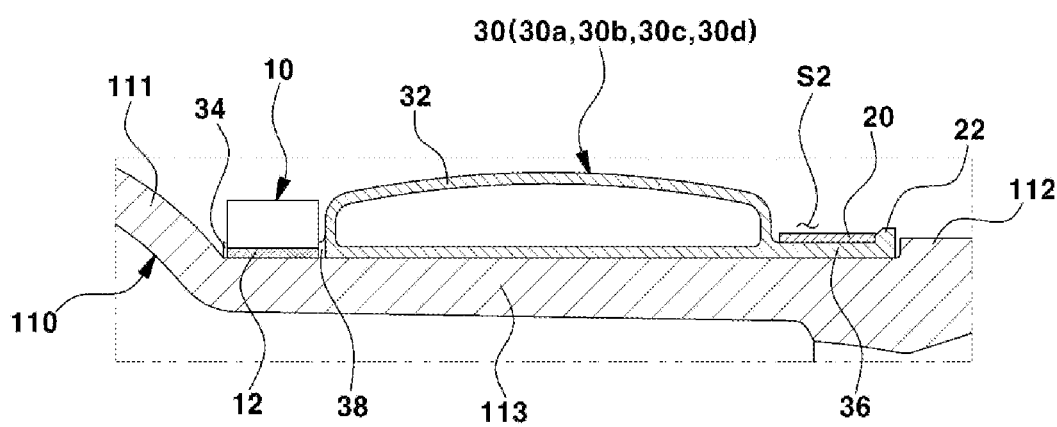
FIG. 2A and FIG. 2B are cross-sectional views illustrating a coupling structure of the resonator wheel according to various exemplary embodiments of the present invention.
Figure 2B:
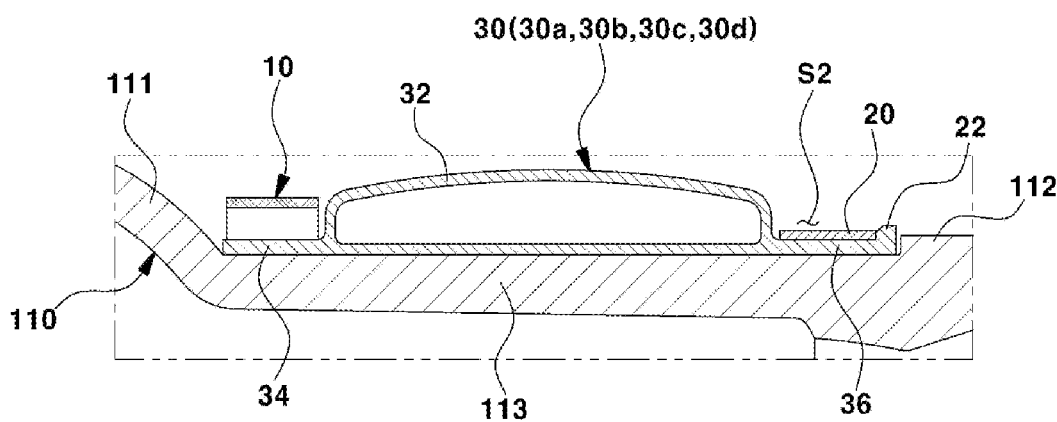
Figure 3:
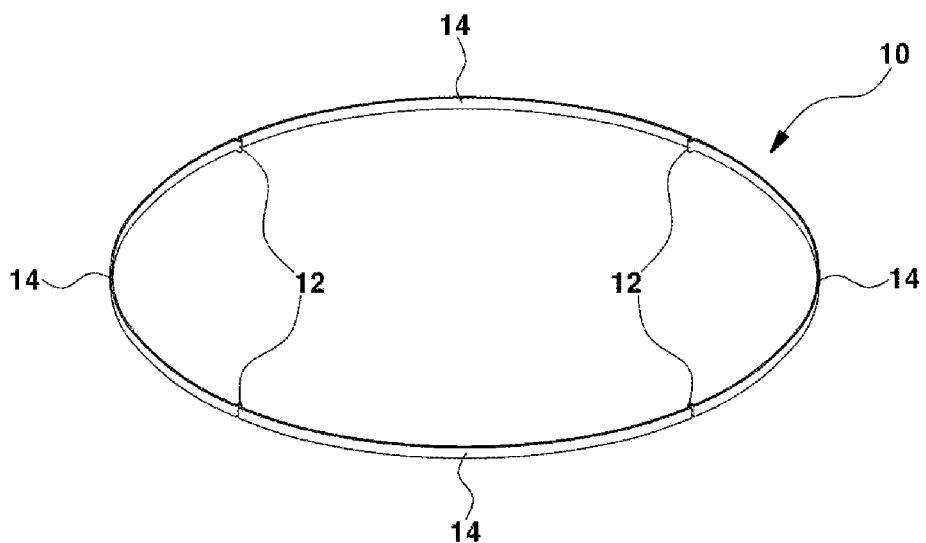
FIG. 3 is a perspective view exemplarily illustrating a first strap according to various exemplary embodiments of the present invention.
Figure 4:
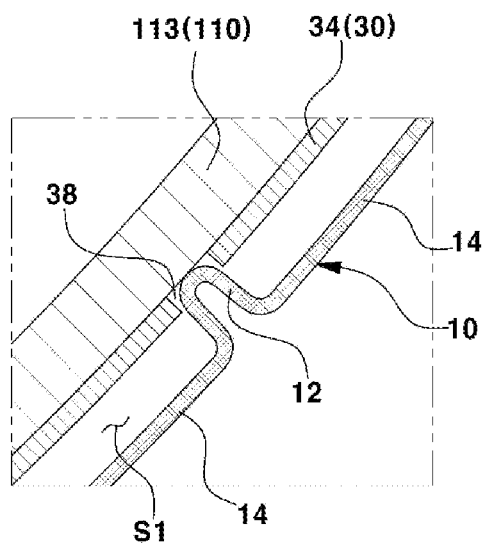
FIG. 4 is a cross-sectional view exemplarily illustrating an assembly structure between the first strap and the resonator according to various exemplary embodiments of the present invention.
Figure 5:
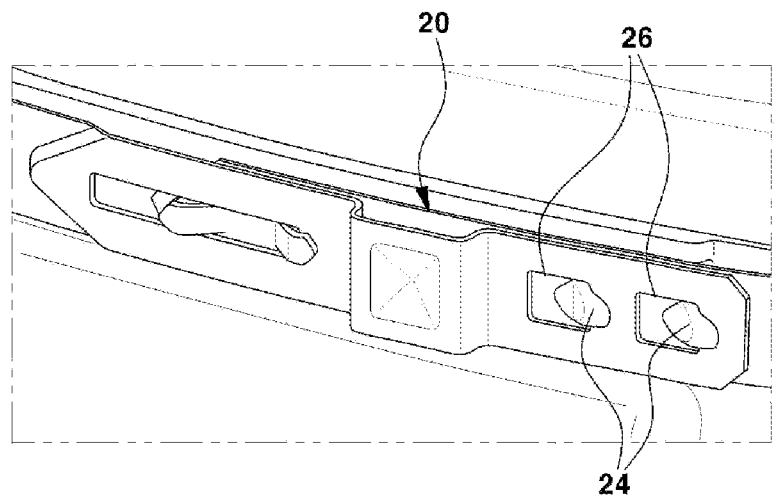
FIG. 5 is a partial diagram illustrating an engagement structure of a second strap according to various exemplary embodiments of the present invention.

FIG. 1 is a perspective view exemplarily illustrating a resonator wheel according to various exemplary embodiments of the present invention, FIG. 2A and FIG. 2B are cross-sectional views illustrating a coupling structure of the resonator wheel according to various exemplary embodiments of the present invention, FIG. 3 is a perspective view exemplarily illustrating a first strap according to various exemplary embodiments of the present invention, FIG. 4 is a cross-sectional view exemplarily illustrating an assembly structure between the first strap and the resonator according to various exemplary embodiments of the present invention, and FIG. 5 is a partial diagram illustrating an engagement structure of a second strap according to various exemplary embodiments of the present invention.

As shown in FIG. 1, a resonator wheel according to various exemplary embodiments of the present invention is a wheel in which a plurality of resonators 30 are mounted on an external circumferential surface of a wheel 100.

The wheel 100 includes a wheel rim 110 and a disc 120. The wheel rim 110 is an annular portion in which the resonator 30 are mounted, and a tire is mounted in the annular portion.

The resonators 30 are mounted and supported on the wheel rim 110 by a first strap 10 and a second strap 20. Thus, unlike a conventional resonator wheel, the wheel 100, does not require a separate configuration (a conventional insertion groove) for mounting the resonators 30, and thus a general vehicle wheel may be applied.

Referring to FIG. 1 and FIG. 2A, the wheel rim 110 includes a resonator mounting portion 113 in which the resonators 30 are mounted and disposed, and a first annular wall 111 and a second annular wall 112 which are integrally formed in both end portions of the resonator mounting portion 113. In the instant case, the both the end portions of the resonator mounting portion 113 are based on an axial direction of the wheel rim 110.

Furthermore, the resonator mounting portion 113 may be formed to be flat to allow a bottom surface of the resonator 30 to be accommodated thereon.

The first annular wall 111 is formed to protrude from an external circumferential surface of the wheel rim 110 and formed to extend in a circumferential direction of the wheel rim 110. The first annular wall 111 is formed to further protrude outward the wheel rim 110 than the resonator mounting portion 113 based on a radial direction of the wheel rim 110.

The second annular wall 112 is formed to protrude from the external circumferential surface of the wheel rim 110 and formed to extend in the circumferential direction of the wheel rim 110. The second annular wall 112 is spaced from the first annular wall 111. The second annular wall 112 may be spaced from the first annular wall 111 by as much as a width of the resonator mounting portion 113.

Based on the axial direction of the wheel rim 110, the first annular wall 111 may be integrally formed in one end portion of the resonator mounting portion 113, and the second annular wall 112 may be integrally formed in the other end portion thereof.

That is, the resonator mounting portion 113 may be integrally formed with the first annular wall 111 and the second annular wall 112 to be disposed between the first annular wall 111 and the second annular wall 112.

The plurality of resonators 30 are mounted and disposed on the external circumferential surface of the wheel rim 110.

In other words, each of the plurality of resonators 30 is mounted in the resonator mounting portion 113 of the wheel rim 110 and is arranged in the circumferential direction of the wheel rim 110.

A first resonator 30a, a second resonator 30b, a third resonator 30c, and a fourth resonator 30d may be mounted in the resonator mounting portion 113.

FIG. 2A and FIG. 2B illustrate a configuration of the first resonator 30a and a shape in which the first resonator 30a is mounted in the resonator mounting portion 113 of the wheel rim 110.

Here, a structure and a mounted shape of the first resonator 30a will be mainly described with reference to FIG. 2A and FIG. 2B. However, the second resonator 30b, the third resonator 30c, and the fourth resonator 30d may be formed in the same manner as the first resonator 30a shown in FIG. 2A and FIG. 2B and also mounted in the resonator mounting portion 113 in the same manner as the first resonator 30a.

However, the first resonator 30a, the second resonator 30b, the third resonator 30c, and the fourth resonator 30d are mounted at different positions of the resonator mounting portion 113 to be arranged in the circumferential direction of the wheel rim 110. Furthermore, the first resonator 30a, the second resonator 30b, the third resonator 30c, and the fourth resonator 30d may be configured to have different resonant frequencies so that it is possible to reduce a noise of the wheel 100 in a wider frequency range.

Referring to FIG. 2A and FIG. 2B, the first resonator 30a includes a resonator main body 32 in which a resonance chamber is formed, and a first flange 34 and a second flange 36 which are formed in both end portions of the resonator main body 32.

That is, the resonator main body 32 is integrally formed with an end portion of the first flange 34 and an end portion of the second flange 36 to be disposed between the first flange 34 and the second flange 36.

In the instant case, the resonator main body 32 may be formed to be higher than the first flange 34 and the second flange 36 based on the radial direction of the wheel rim 110 to further protrude outward the wheel rim 110.

The resonator main body 32 is configured to reduce a noise generated from the wheel 100 using the principle of a Helmholtz resonator.

The first resonator 30a is mounted in the resonator mounting portion 113 using the first flange 34 and the second flange 36. In other words, the first resonator 30a is coupled such that the first flange 34 and the second flange 36 are fixed to the resonator mounting portion 113.

Thus, the first resonator 30a is integrally formed with the first flange 34 and the second flange 36 in both the side portions of the resonator main body 32 to be coupled to the resonator mounting portion 113.

The first flange 34 is formed to protrude from one edge portion of the resonator main body 32 in the axial direction of the wheel rim 110 and also formed to extend in the circumferential direction of the wheel rim 110.

That is, the first flange 34 is formed to extend from the one edge portion of the resonator main body 32 in an annular shape in the circumferential direction of the wheel rim 110. Furthermore, the first flange 34 is formed to be pressed against an external surface of the resonator mounting portion 113.

Furthermore, a bead groove 38 is formed to allow the first flange 34 to be engaged with the first strap 10. The bead groove 38 may be formed to extend in the axial direction of the wheel rim 110.

The second flange 36 is formed to protrude from the other edge portion of the resonator main body 32 in the axial direction of the wheel rim 110 and also formed to extend in the circumferential direction of the wheel rim 110.

That is, the second flange 36 is formed to extend from the other edge portion of the resonator main body 32 in an annular shape in the circumferential direction of the wheel rim 110. Furthermore, the second flange 36 is formed to be pressed against the external surface of the resonator mounting portion 113.

Furthermore, a separation prevention protrusion 22 radially protruding outward the wheel rim 110 may be formed on an edge portion of the second flange 36.

The separation prevention protrusion 22 may be formed to be higher than the second flange 36 based on the radial direction of the wheel rim 110 to prevent the second strap 20, which is disposed and mounted on the second flange 36, from being separated from the second flange 36.

When the second flange 36 is disposed in the resonator mounting portion 113, the separation prevention protrusion 22 may be disposed to be adjacent to the second annular wall 112 of the wheel rim 110.

Meanwhile, the first strap 10 is provided for supporting the resonators 30 disposed on the external circumferential surface of the resonator mounting portion 113 and fixing mounting positions of the resonators 30 and is assembled with the resonator mounting portion 113 before the resonators 30 are assembled with the resonator mounting portion 113.

Referring to FIG. 3, the first strap 10 is formed as an annular strap extending in a circumferential direction of the resonator mounting portion 113.

Referring to FIG. 4, the first strap 10 is formed to have a plurality of beads 12 for binding with the first flange 34, and the plurality of beads 12 are spaced from each other in the circumferential direction of the first strap 10.

The first strap 10 may be provided with four beads 12 according to the number of resonators 30 mounted on the wheel rim 110. The four beads 12 may be disposed at regular intervals in the circumferential direction of the first strap 10.

Each of the beads 12 may be a portion bent from one side of the first strap 10 toward a radially internal side thereof and formed to have a cross section of a substantially U shape.

A section in which the beads 12 are not formed may be present in the first strap 10, and the section may be referred to as a non-bead portion 14. Thus, the first strap 10 may be divided into the non-bead portion 14 and the bead 12. That is, the first strap 10 may include the non-bead portion 14 and the bead 12 integrally formed in an end portion of the non-bead portion 14.

When the first strap 10 is assembled with the resonator mounting portion 113, a bottom surface of the bead 12 is in contact with the external surface of the resonator mounting portion 113 based on the radial direction of the first strap 10, and a predetermined space (a first space S1) is formed between the resonator mounting portion 113 and the non-bead portion 14. The first space S1 may be formed according to a size of the bead 12 in a radial direction thereof.

Furthermore, the first flange 34 of each of the resonators 30 is inserted into the first space S1. Each of the resonators 30 is accommodated on the resonator mounting portion 113 in a state in which the first flange 34 is inserted into the first space S1.

To the present end, the bead 12 is formed to have a predetermined size and to be bent to a predetermined length from the end portion of the non-bead portion 14.

When the first flange 34 of the resonator 30 is inserted into the first space S1, the bead 12 of the first strap 10 is inserted into the bead groove 38 of the first flange 34.

In other words, the first flange 34 is inserted into the first space S1 between the non-bead portion 14 of the first strap 10 and the resonator mounting portion 113 such that the bead 12 of the first strap 10 is inserted into the bead groove 38.

In the instant case, the first strap 10 surrounds an external surface of the first flange 34 inserted into the first space S1.

In a state in which the first flange 34 of the resonator 30 is supported on the first strap 10, the second strap 20 is mounted on the second flange 36 of the resonator 30.

To simultaneously support the second flanges 36 of the resonators 30 disposed in the resonator mounting portion 113, the second strap 20 is formed in an annular shape extending in the circumferential direction of the resonator mounting portion 113.

The second strap 20 is configured to surround external surfaces of the second flanges 36 in the circumferential direction of the resonator mounting portion 113, pressurizing the second flanges 36 toward the resonator mounting portion 113.

In other words, the second strap 20 surrounds external circumferential surfaces of the second flanges 36 to pressurize the second flanges 36 toward a radially internal side of the resonator mounting portion 113. Consequently, the resonators 30 are coupled and fixed to the resonator mounting portion 113.

When the second strap 20 is mounted on the second flange 36, the second strap 20 is located in a space between the separation prevention protrusion 22 of the second flange 36 and the resonator main body 32 (i.e., a second space S2). Thus, it is also possible to prevent the second strap 20 from being separated from the second flange 36 in the axial direction of the wheel rim 110.

The separation prevention protrusion 22 may be formed to protrude from the external surface of the second flange 36 toward a radially external side thereof.

Since the second strap 20 pressurizes the second flange 36 to a radially internal side of the wheel rim 110, a normal force that the external circumferential surface of the wheel rim 110 (i.e., the resonator mounting portion 113) applies to the second flange 36 of the resonator 30 is also increased.

Thus, a larger frictional force is generated between the resonator 30 and the wheel rim 110 so that it is possible to prevent the resonator 30 from being moved in the circumferential direction or the axial direction on the surface of the resonator mounting portion 113 due to the second strap 20.

Furthermore, to adjust a pressurizing force acting on the second flange 36 due to the second strap 20, one side portion of the second strap 20 may be configured as a separable and engageable structure.

Referring to FIG. 5, a plurality of hooks 24 may be formed in one end portion of the second strap 20 in the circumferential direction thereof, and a plurality of catching holes 26 to which the hooks 24 are configured for being caught and fixed may be formed in the other end portion of the second strap 20 in the circumferential direction thereof.

Furthermore, when the second strap 20 pressurizes the second flange 36 to the radially internal side of the wheel rim 110, tensile stress is applied to the second strap 20, and when the pressurizing force of the second strap 20 is increased, larger tensile stress is applied to the second strap 20.

Therefore, the second strap 20 may be configured for withstanding high tensile stress, and to the present end, the second strap 20 is made of a metal material with sufficient rigidity, such as stainless steel.

Here, a process of mounting the resonators 30 on the wheel rim 110 will be described with reference to FIGS. 6A to 6E. In the order of FIGS. 6A to 6E, the resonators 30 may be mounted on the resonator mounting portion 113 of the wheel rim 110.

Figure 6A:
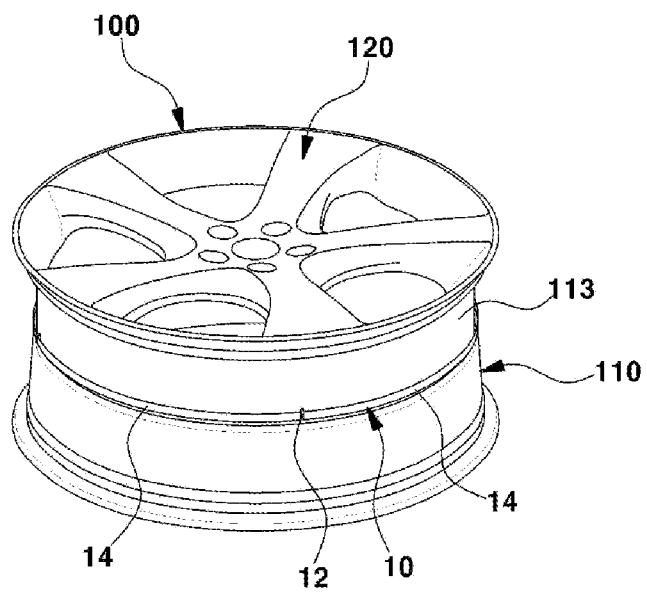
FIG. 6A, FIG. 6B, FIG. 6C, FIG. 6D and FIG. 6E are diagrams illustrating a process in which the resonator is mounted on a wheel rim.

First, as shown in FIG. 6A, the first strap 10 is assembled with the resonator mounting portion 113 of the wheel rim 110. In the instant case, the first strap 10 is located in the resonator mounting portion 113 to be adjacent to the first annular wall 111, and the bottom surface of the bead 12 of the first strap 10 is in contact with the external surface of the resonator mounting portion 113.

That is, the first strap 10 is disposed on the resonator mounting portion 113 such that the bottom surface of the bead 12 is in contact with the external surface of the resonator mounting portion 113.

Figure 6B:
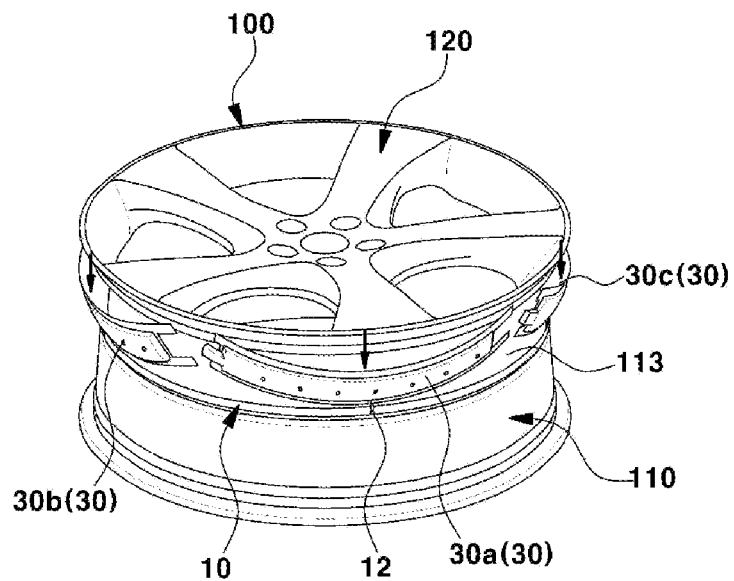
Figure 6C:
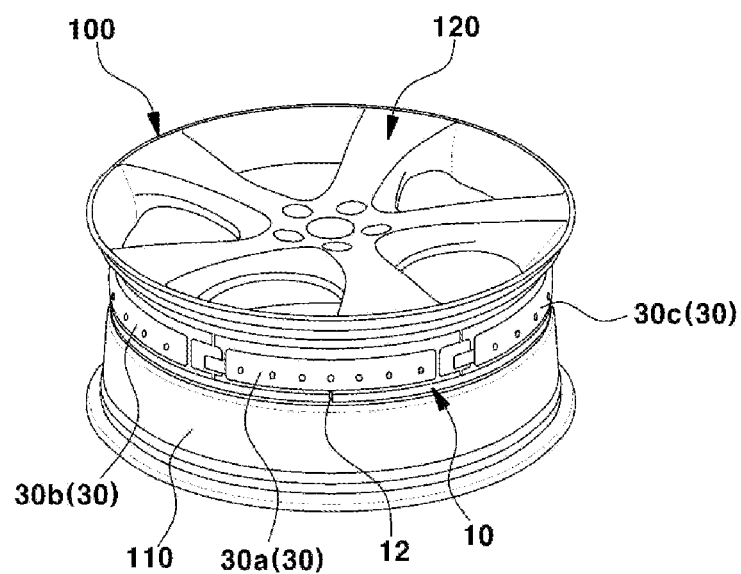

Next, as shown in FIGS. 6B and 6C, the first flange 34 of the first resonator 30a is inserted into the first space S1 between the non-bead portion 14 of the first strap 10 and the resonator mounting portion 113. When the first flange 34 is inserted into the first space S1, the bead 12 of the first strap 10 is inserted into the bead groove 38 of the first flange 34.

That is, the first flange 34 is inserted into the first space S1 such that the bead 12 of the first strap 10 is inserted into the bead groove 38 of the first flange 34.

The bead 12 also is configured as a guide by indicating an assembly position of the first resonator 30a which is mounted on the resonator mounting portion 113.

As described above, since the first flange 34 of the first resonator 30a is inserted into the first space S1, when the first resonator 30a is coupled to the wheel rim 110 using the second strap 20, it is possible to prevent the movement and separation of the first resonator 30a.

The second resonator 30b, the third resonator 30c, and the fourth resonator 30d are pre-mounted in the resonator mounting portion 113 in the same assembly method as the first resonator 30a.

Figure 6D:
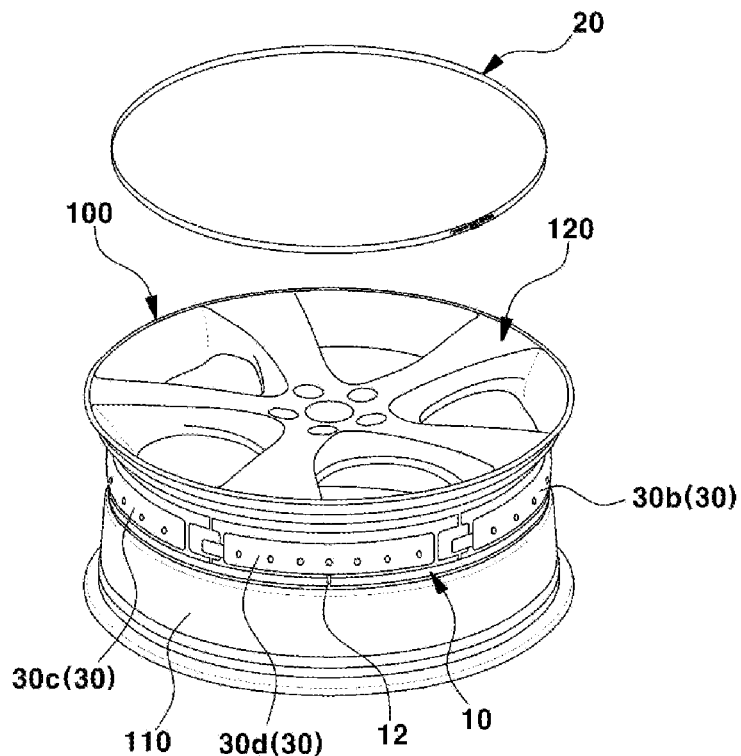
Figure 6E:
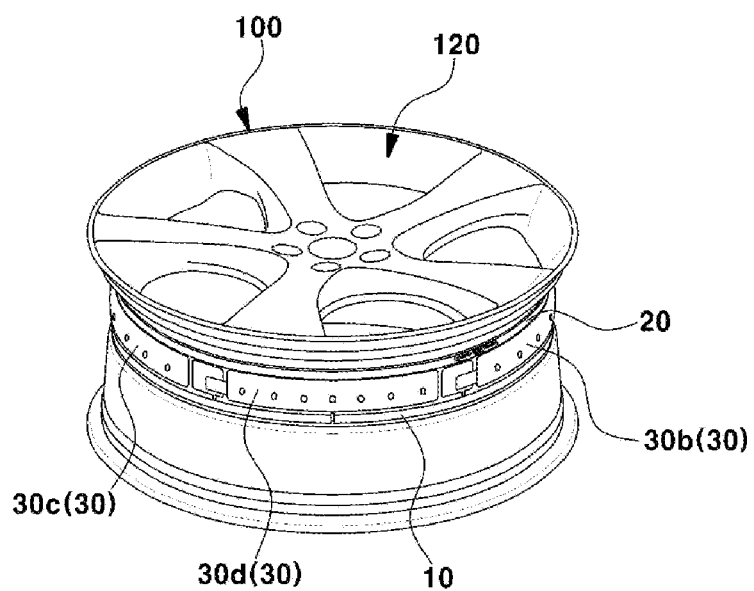
Figure 7:
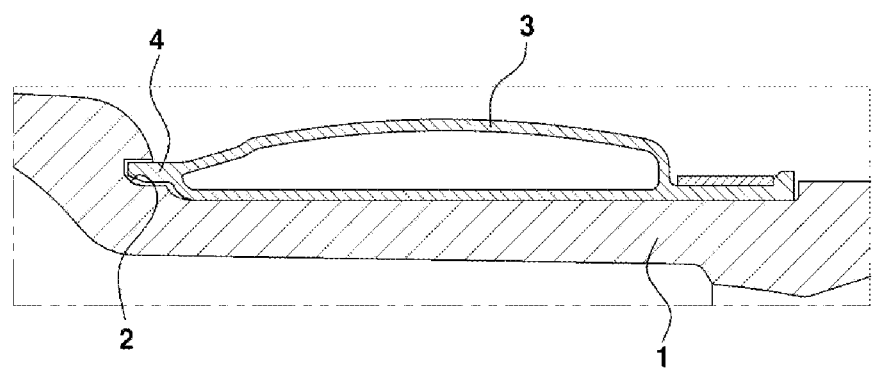
FIG. 7 is a diagram illustrating a conventional resonator wheel.

Next, as shown in FIGS. 6D and 6E, the second strap 20 is mounted on the second flange 36 of the first resonator 30a to couple the first resonator 30a to the resonator mounting portion 113.

The second strap 20 is mounted on the second flange 36 of the first resonator 30a to pressurize the second flange 36 toward the resonator mounting portion 113. In the instant case, the second strap 20 pressurizes the second flange 36 toward the radially internal side of the wheel rim 110.

The second resonator 30b, the third resonator 30c, and the fourth resonator 30d are mounted and coupled to the resonator mounting portion 113 in the same assembly method as the first resonator 30a.

As described above, the resonators 30 are pre-mounted on the resonator mounting portion 113 of the wheel rim 110 using the first strap 10 and positions of the resonators 30 are fixed, and then the resonators 30 are fixedly coupled the resonator mounting portion 113 using a second strap 20. Consequently, while driving, the resonators 30 may be robust against external forces (a centrifugal force and a front-rear force) acting on the resonators 30 to secure durability and impact resistance, and also, minimize occurrence of side effects.

Various aspects of the present invention provide the following effects through the above-described problem solving means.

First, a first strap is used, it is possible to omit a conventional insertion groove which is formed on a wheel rim and intended to fix a resonator, and thus while driving, the resonator may be robust against an external force acting on the resonators to secure durability and impact resistance.

Second, it is possible to omit a notch portion for forming the conventional insertion groove from an external circumferential surface of the wheel rim, reducing a weight of the wheel rim.

Third, a dedicated wheel for mounting a resonator, which includes the conventional insertion groove, is not required, and a general wheel may be applied.

Fourth, it is possible to secure tire the ease of assembly and mass production.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A device for coupling at least one resonator to a vehicle wheel, the device comprising:
    an annular first strap assembled with an external circumferential surface of a wheel rim to fix positions of the at least one resonator disposed on the external circumferential surface of the wheel rim to the wheel rim, wherein first flanges formed on first edge portions of the at least one resonator based on an axial direction of the wheel rim, are inserted between the annular first strap and the external circumferential surface of the wheel rim; and
    an annular second strap surrounding second flanges formed at second edge portions of the at least one resonator based on the axial direction of the wheel rim and pressurizing the second flanges toward the external circumferential surface of the wheel rim,
    wherein a plurality of beads is formed in the annular first strap to be disposed to be spaced from each other in a circumferential direction of the first strap, and bead grooves in which the plurality of beads is insertable are formed in the first flanges of the at least one resonator.

2. The device of claim 1, wherein the annular second strap is configured to pressurize the second flanges toward the external circumferential surface of the wheel rim after the first flanges are inserted between the annular first strap and the external circumferential surface of the wheel rim.

3. The device of claim 1, wherein the wheel rim includes:
    a first annular wall protruding from the external circumferential surface of the wheel rim to extend in a circumferential direction of the wheel rim;
    a second annular wall protruding from the external circumferential surface of the wheel rim to extend in the circumferential direction of the wheel rim and disposed to be spaced from the first annular wall; and
    a resonator mounting portion which is formed between the first annular wall and the second annular wall and in which the at least one resonator is disposed on an external surface of the resonator mounting portion in the circumferential direction of the wheel rim.

4. The device of claim 3,
    wherein the annular first strap includes a non-bead portion which is a section in which the plurality of beads is not formed, and
    wherein a first space is formed between the non-bead portion and the resonator mounting portion according to a size of the plurality of beads, and the first flanges are inserted into the first space.

5. The device of claim 1, wherein a separation prevention protrusion is formed at an edge portion of the second flanges to protrude outward in a radial direction of the wheel rim, and the separation prevention protrusion prevents the annular second strap from being separated from the second flanges in the axial direction of the wheel rim.

6. The device of claim 5, wherein each of the at least one resonator includes a resonator main body formed between the first flanges and the second flanges, and when the annular second strap is mounted on the second flanges, the annular second strap is located in a second space formed between the separation prevention protrusion and the resonator main body.

7. The device of claim 4, wherein the annular first strap is assembled with the resonator mounting portion prior to the at least one resonator, and when the annular first strap is assembled with the resonator mounting portion, a bottom surface of the plurality of beads is in contact with an external surface of the resonator mounting portion.

8. The device of claim 1, wherein the annular second strap pressurizes the second flanges to a radially internal side of the wheel rim.

9. The device of claim 1, wherein the first flanges and the second flanges are formed at first and second edge portions of a resonator main body to extend in a circumferential direction of the wheel rim.

10. The device of claim 3, wherein a size of the plurality of beads is a size of the wheel rim in a radial direction thereof.

11. The device of claim 1, wherein a plurality of hooks is formed in one end portion of the annular second strap in a circumferential direction of the wheel rim, and a plurality of catching holes to which the plurality of hooks is caught and fixed is formed in another end portion of the annular second strap in the circumferential direction.

* * * * *